(12) United States Patent
Kordosh

(10) Patent No.: US 9,914,848 B1
(45) Date of Patent: Mar. 13, 2018

(54) REFINISH COATING COMPOSITION

(71) Applicant: PPG Architectural Finishes, Inc., Pittsburgh, PA (US)

(72) Inventor: John R. Kordosh, Imperial Beach, CA (US)

(73) Assignee: PPG Architectural Finishes, Inc., Pittsburgh, PA (US)

( * ) Notice: Subject to any disclaimer, the term of this patent is extended or adjusted under 35 U.S.C. 154(b) by 0 days.

(21) Appl. No.: 15/338,670

(22) Filed: Oct. 31, 2016

(51) Int. Cl.
| | | |
|---|---|---|
| C09D 167/08 | (2006.01) | |
| C09F 9/00 | (2006.01) | |
| C09D 7/02 | (2006.01) | |
| C09D 7/12 | (2006.01) | |
| C09D 7/04 | (2006.01) | |
| C09D 7/00 | (2006.01) | |
| C09D 5/00 | (2006.01) | |
| C09D 5/02 | (2006.01) | |
| B05D 3/00 | (2006.01) | |

(52) U.S. Cl.
CPC ........... *C09D 167/08* (2013.01); *B05D 3/007* (2013.01); *C09D 5/00* (2013.01); *C09D 5/021* (2013.01); *C09D 7/001* (2013.01); *C09D 7/02* (2013.01); *C09D 7/04* (2013.01); *C09D 7/1233* (2013.01); *C09F 9/00* (2013.01)

(58) Field of Classification Search
CPC ...... C09D 167/08; C09D 7/02; C09D 7/1233; C09D 7/04; C09D 7/001; C09D 5/00; C09D 5/021; C09F 9/00; B05D 3/007
USPC .......................................................... 524/92
See application file for complete search history.

(56) References Cited

U.S. PATENT DOCUMENTS

| | | | |
|---|---|---|---|
| 3,733,289 A | | 5/1973 | Burns et al. |
| 3,740,365 A | | 6/1973 | Shuler et al. |
| 3,893,960 A | | 7/1975 | Sheppard |
| 4,225,473 A | | 9/1980 | Heilberger |
| 4,242,243 A | | 12/1980 | Antonelli et al. |
| 4,511,484 A | | 4/1985 | Anonuma et al. |
| 4,532,021 A | | 7/1985 | Murphy et al. |
| 4,597,817 A | * | 7/1986 | Larsen ..................... B05D 7/54 156/280 |
| 4,777,002 A | | 10/1988 | Putz |
| 5,260,064 A | * | 11/1993 | Nakagawa ........... A61K 9/7053 424/443 |
| 5,286,393 A | | 2/1994 | Oldiges et al. |
| 5,306,776 A | | 4/1994 | Matsumoto et al. |
| 5,424,370 A | | 6/1995 | Matsumoto et al. |
| 5,632,810 A | | 5/1997 | Stephen et al. |
| 5,759,252 A | | 6/1998 | Edelman et al. |
| 5,888,544 A | | 3/1999 | Gergely et al. |
| 5,910,375 A | | 6/1999 | Parker et al. |
| 6,358,564 B1 | | 3/2002 | Kordosh |
| 6,959,691 B2 | | 11/2005 | Ueda et al. |
| 7,030,170 B2 | * | 4/2006 | Tahara .................... G03F 7/037 428/473.5 |
| 7,223,519 B2 | | 5/2007 | Barr et al. |
| 7,282,092 B2 | | 10/2007 | Holland et al. |
| 7,462,654 B2 | | 12/2008 | Field |
| 8,097,143 B2 | | 1/2012 | Fujita |
| 8,354,121 B2 | | 1/2013 | Maeda et al. |
| 2002/0169241 A1 | | 11/2002 | Colyer et al. |
| 2013/0331487 A1 | | 12/2013 | Hage et al. |
| 2014/0034225 A1 | | 2/2014 | Kendig |
| 2014/0272124 A1 | | 9/2014 | Kordosh et al. |

FOREIGN PATENT DOCUMENTS

| | | |
|---|---|---|
| CA | 805638 A | 2/1969 |
| CN | 1426901 A | 7/2003 |
| CN | 101050605 A | 10/2007 |
| CN | 101514270 A | 8/2009 |
| CN | 102260441 A | 11/2011 |
| CN | 104513595 A | 4/2015 |
| CN | 105017966 A | 11/2015 |
| CN | 105131835 A | 12/2015 |
| CN | 10586790 | 8/2016 |
| CN | 105970098 A | 9/2016 |
| CN | 106221448 A | 12/2016 |
| CN | 106590162 A | 4/2017 |
| JP | S5718733 A | 1/1982 |
| JP | S6246638 A | 2/1987 |
| JP | H03170951 A | 7/1991 |
| JP | 2003103544 A | 4/2003 |
| JP | 2003160774 A | 6/2003 |
| JP | 2004136479 A | 5/2004 |
| JP | 2005183093 A | 7/2005 |
| JP | 2006241452 A | 9/2006 |
| JP | 2007128057 A | 5/2007 |
| JP | 2007146279 A | 6/2007 |
| JP | 2007213955 A | 8/2007 |
| JP | 2007246961 A | 9/2007 |
| JP | 2007284697 A | 11/2007 |
| JP | 2008018649 A | 1/2008 |
| JP | 2008088445 A | 4/2008 |
| JP | 2016094357 A | 5/2016 |
| KR | 101262291 B1 | 5/2013 |
| KR | 20150068866 A | 6/2015 |
| WO | 9640813 A1 | 12/1996 |
| WO | 2009043588 A2 | 4/2009 |
| WO | 2015157019 A1 | 10/2015 |
| WO | 2016102464 A1 | 6/2016 |

\* cited by examiner

*Primary Examiner* — Michael M Bernshteyn
(74) *Attorney, Agent, or Firm* — Charles M. Yeomans

(57) ABSTRACT

The present invention is directed to a coating composition comprising an alkyd resin; an acrylic polymer; a metallic drier; an adhesion promoter; and a solvent. Also disclosed are coatings formed from the coating composition. Also disclosed are methods of coating a substrate.

26 Claims, No Drawings

REFINISH COATING COMPOSITION

FIELD OF THE INVENTION

The present invention relates to coating compositions that provide a hard, glossy, protective finish to a coated substrate.

BACKGROUND OF THE INVENTION

Refinishing surfaces that are subject to severe and frequent washing, such as bath tubs, sinks and tile, require a coating that will impart unique characteristics. The coating must provide a hard, protective and long-lasting durable finish to the surface of the coated substrate. Additionally, the coating must adhere to the fiberglass, porcelain, glazed ceramic tile, and countertop laminate materials that typically comprise these substrates. Finally, the coating must impart desired aesthetics such as color and glossiness to the coated substrate.

Conventional coating compositions used to refinish such surfaces may include an alkyd or epoxy resin. However, these compositions may require long drying times or provide inadequate physical or aesthetic characteristics. For example, conventional coatings may provide insufficient hardness or a coating that yellows or does not achieve an adequate gloss level. Yellowing and gloss are especially important properties for bathtubs, sinks and tile as a glossy, white color is often desired. Therefore, a coating composition to refinish surfaces that provides a quick drying time, adequate hardness and durability, and appropriate aesthetic features is desired.

SUMMARY OF THE INVENTION

An aspect of the invention provides a coating composition comprising a chain-stopped alkyd resin; an acrylic polymer; a metallic drier; an adhesion promoter; and a solvent.

Another aspect of the invention provides a method of coating a substrate comprising applying a coating composition comprising a chain-stopped alkyd resin, an acrylic polymer, a metallic drier, an adhesion promoter, and a solvent to the substrate; and allowing the coating composition to cure to form a coating at ambient conditions.

A further aspect of the invention provides a coating formed by at least partially curing a coating composition comprising a chain-stopped alkyd resin, an acrylic polymer, a metallic drier, an adhesion promoter, and a solvent.

DETAILED DESCRIPTION OF THE INVENTION

The present invention is directed to a coating composition comprising an alkyd resin; an acrylic polymer; a metallic drier; an adhesion promoter; and a solvent.

According to the present invention, the alkyd resin may comprise the residue of a polyester resin and an acid. The polyester resin may comprise the residue of a diacid and/or acid anhydride and a polyol. The diacid may comprise phthalic acid, succinic acid, adipic acid, azelaic acid, sebacic acid, maleic acid, fumaric acid, tetrahydrophthalic acid, and hexahydrophthalic acid. Besides the diacids mentioned above, functional equivalents of the diacids such as anhydrides where they exist may be used, including, for example, phthalic anhydride and maleic anhydride. Combinations of the diacids and/or acid anyhydrides may also be used. The polyol may comprise ethylene glycol, propylene glycol, butylene glycol, 1,6-hexylene glycol, neopentyl glycol, diethylene glycol, glycerol, trimethylol propane, glycerol, pentaerythritol, and combinations thereof.

The acid may comprise an organic acid, such as a fatty acid. The fatty acid may comprise a C1-C20 organic acid. The fatty acid may comprise an unsaturated fatty acid, and the alkyd resin may comprise a drying alkyd resin (including semi-drying). Suitable unsaturated fatty acids may include, but are not limited to, α-linolenic acid, stearidonic acid, eicosapentaenoic acid, linoleic acid, γ-linolenic acid, dihomo-γ-linolenic acid, arachidonic acid, palmitoleic acid, vaccenic acid, paullinic acid, oleic acid, elaidic acid, gondoic acid, crotonic acid, myristoleic, sapienic acid, eicosadienoic acid, pinolenic acid, eleostearic acid, and mead acid. Combinations of acids may also be used.

The acid may be derived from an oil, such as a triglyceride oil. The oil may comprise a vegetable oil. Suitable vegetable oils include, but at not limited to, soybean oil, linseed oil, palm oil, coconut oil, canola oil, and sunflower oil.

The alkyd resin may comprise a chain-stopped alkyd resin. Chain-stopped alkyd resins may be produced by incorporating benzoic acid or para-tert-butylbenzoic acid into the composition of the alkyd to control the degree of polymerization and reduce the functionality of the resulting alkyd resin. Chain-stopping the alkyd resin also allows for control of the molecular weight (and hence viscosity) of the resin. Suitable commercially available chain-stopped alkyd resins include LA-8814, available from US Polymers.

The alkyd resin may have a hydroxyl equivalent weight of at least 200 g/OH, such as at least 300 g/OH, such as at least 400 g/OH, such as at least 450 g/OH, and may be no more than 800 g/OH, such as no more than 700 g/OH, such as no more than 600 g/OH, such as no more than 550 g/OH. According to the present invention, the alkyd resin may have a hydroxyl equivalent weight of 200 g/OH to 800 g/OH, such as 300 g/OH to 700 g/OH, such as 400 g/OH to 600 g/OH, such as 450 g/OH to 550 g/OH. As used herein, the "hydroxyl equivalent weight" refers to the theoretical average molecular weight of the alkyd resin divided by the number of hydroxyl groups present in the alkyd resin. The hydroxyl equivalent weight may be determined from the hydroxyl value of the alkyd resin as measured according to ASTM E222-10.

The alkyd resin may be present in the coating composition in an amount of at least 20% by weight, based on the total weight of the coating composition, such as at least 23% by weight, such as at least 25% by weight, and may be present in an amount of no more than 45% by weight, such as no more than 31% by weight, such as no more than 29% by weight. According to the present invention, the alkyd resin may be present in the coating composition in an amount of 20% to 45% by weight, based on the total weight of the coating composition, such as 23% to 31% by weight, such as 25% to 29% by weight.

According to the present invention, the coating composition may further comprise an acrylic polymer. According to the present invention, the acrylic polymer may comprise the residue of one or more ethylenically unsaturated monomers including, without limitation, methyl(meth)acrylate, ethyl (meth)acrylate, butyl (meth)acrylate, hexyl (meth)acrylate, octyl (meth)acrylate, isodecyl (meth)acrylate, stearyl (meth)acrylate, isobutyl (meth)acrylate, 2-ethylhexyl (meth)acrylate, isobornyl (meth)acrylate and t-butyl (meth)acrylate. As used herein, "(meth)acrylate" and like terms encompasses both acrylates and methacrylates. The acrylic polymer may comprise residues of a cycloaliphatic monomer in an amount of less than 45% by weight, based on the total weight of the ethylenically unsaturated monomers polymerized, or the acrylic polymer may be free of residues of a cycloaliphatic monomer, i.e., 0% by weight.

The acrylic polymer may comprise a thermoplastic acrylic copolymer comprising, consisting of, or consisting essentially of the residue of methyl (meth)acrylate and butyl (meth)acrylate, such as the residue of methyl methacrylate and butyl methacrylate. Suitable commercially available thermoplastic acrylic copolymers include PARALOID XR-34, available from The Dow Chemical Company.

The acrylic polymer may have a weight average molecular weight ($M_w$) of at least 15,000, g/mol, such as at least 20,000 g/mol, such as at least 28,000, g/mol, and may have a weight average molecular weight ($M_w$) of no more than 40,000 g/mol, such as no more than 35,000 g/mol, such as no more than 32,000 g/mol. According to the present invention, the acrylic polymer may have a weight average molecular weight ($M_w$) of 15,000 g/mol to 40,000 g/mol, such as 20,000 g/mol to 35,000 g/mol, such as 28,000 g/mol to 32,000 g/mol. According to the present invention, the acrylic polymer may have a weight average molecular weight ($M_w$) of 30,000 g/mol. The weight average molecular weight may be determined by gel permeation chromatography using polystyrene standards.

The acrylic polymer may be substantially free of hydroxyl functional groups. As used herein, an acrylic polymer is "substantially free" of hydroxyl functional groups if acrylic polymer comprising hydroxyl functional groups are present in the coating composition an amount of 1% by weight or less, based on the total weight of the acrylic polymer.

The acrylic polymer may be completely free of hydroxyl functional groups. As used herein, an acrylic polymer is "completely free" of hydroxyl functional groups if acrylic polymer comprising hydroxyl functional groups are not present in the coating composition.

The acrylic polymer may be present in the coating composition in an amount of at least 2% by weight, based on the total weight of the coating composition, such as at least 3% by weight, such as at least 4% by weight, and may be present in an amount of no more than 10% by weight, such as no more than 8% by weight, such as no more than 6% by weight. According to the present invention, the acrylic polymer may be present in the coating composition in an amount of 2% to 10% by weight, based on the total weight of the coating composition, such as 3% to 8% by weight, such as 4% to 6% by weight.

According to the present invention, the weight ratio of alkyd resin to acrylic polymer present in the coating composition may be 1:1 to 10:1, such as 1.5:1 to 5:1, such as 2:1 to 4:1. According to the present invention, the weight ratio of alkyd resin to acrylic polymer in the coating composition may be about 4:1.

According to the present invention, the coating composition may further comprise a metallic drier. The metallic drier may comprise a metal complex comprising a polyvalent metal salt comprising alkyl or aryl carboxylates, such as $C_6$-$C_{18}$ carboxylates, halides, nitrates, sulfates or acetoacetoates, of metals such as cobalt, manganese, lead, zirconium, zinc, vanadium, strontium, calcium and iron, and their complexes may be referred to as primary driers or metal soaps. "Redox-active" metal means a metal that may exist in different oxidation states. Redox-active transition metals, such as cobalt, manganese, vanadium and iron, enhance radical formation, and thus enhance the oxidative curing process. Complexes based on strontium, zirconium and calcium may enhance the action of the redox-active metals, and may be referred to as secondary driers.

The metallic drier may comprise a metal ligand complex comprising a complex of metal, such as iron, cobalt, manganese or vanadium, and a tridentate, tetradentate, pentadentate or hexadentate nitrogen donor ligand. The ligand may comprise a bispidine ligand, such as bispidon (di-substituted 3-methyl-9-oxo-2,4-di(pyridine-2-yl)-7-(pyridine-2-ylmethyl)-3,7-diazabicyclo[3.3.1]nonane-1,5-dicarboxylate). According to the present invention, the metal ligand complex may comprise an Fe(II) complex of di-substituted 3-methyl-9-oxo-2,4-di(pyridine-2-yl)-7-(pyridine-2-ylmethyl)-3,7-diazabicyclo[3.3.1]nonane-1,5-dicarboxylate; [(bispidon)Fe(II)Cl]Cl; [(bispidon)Fe(II)SO$_4$]; or [(bispidon)Fe(II)Cl]Cl, which is also known as iron(1+), chloro[dimethyl-9,9-dihydroxy-3-methyl-2,4-di(2-pyridyl-κN)-7-[(2-pyridinyl-κN)methyl]-3,7-diazabicyclo[3.3.1] nonane-1,5-dicarboxylate-κN3, κN7]-, chloride(1−) (commercially available as Borchi® Oxy-Coat from OMG Borchers GmbH).

The coating composition may be essentially free of a dinuclear manganese complex comprising a 1,4,7-trisubstituted-1,4,7-triazacyclononane ligand. As used herein, a coating composition is "essentially free" of a dinuclear manganese complex comprising a 1,4,7-trisubstituted-1,4,7-triazacyclononane ligand if the dinuclear manganese complex comprising a 1,4,7-trisubstituted-1,4,7-triazacyclononane ligand is present in an amount less than 0.001% by weight, based on the total weight of the coating composition.

The coating composition may be free of a dinuclear manganese complex comprising a 1,4,7-trisubstituted-1,4,7-triazacyclononane ligand. As used herein, a coating composition is "free" of a dinuclear manganese complex comprising a 1,4,7-trisubstituted-1,4,7-triazacyclononane ligand if a dinuclear manganese complex comprising a 1,4,7-trisubstituted-1,4,7-triazacyclononane ligand is not present in the coating composition, i.e., 0% by weight.

The metallic drier may be present in the coating composition in an amount of at least 0.20% by weight, based on the total weight of the composition, such as at least 0.35% by weight, such as at least 0.40% by weight, and may be present in an amount of no more than 0.65% by weight, such as no more than 0.55% by weight, such as no more than 0.50% by weight. According to the present invention, the metallic drier may be present in the coating composition in an amount of 0.20% to 0.65% by weight, based on the total weight of the coating composition, such as 0.35% to 0.55% by weight, such as 0.40% to 0.50% by weight.

According to the present invention, the coating composition may further comprise an adhesion promoter. The adhesion promoter may comprise a silane. The silane may comprise an organosilane, such as an organotrialkoxysilane, having the general formula X—R—Si(OR')$_3$, wherein X is a hydrogen atom or a non-hydrolyzable organic moiety, R is a $C_1$ to $C_{10}$ aryl or alkyl chain or combined aryl-alkyl chain, and OR' is a hydrolyzable group, such as an alkoxy group or an acetoxy group, such as a $C_1$ to $C_4$ alkoxy group. The organosilane adhesion promoter may comprise nonreactive alkyl organosilanes such as alkyl trimethoxysilane and alkyl triethoxysilane, and functionalized organosilanes comprising amino, vinyl, (meth)acrylate, epoxy, mercapto, chloropropyl, or sulfide functional groups. Examples of suitable organosilane adhesion promoters include aminoethylaminopropyltrimethoxysilane (commercially available as Z-6020 SILANE from Dow Corning®), aminopropyltriethoxysilane (commercially available as Z-6011 SILANE from Dow Corning®), vinylbenzylated aminoethylaminopropyltrimethoxysilane (commercially available as OFS-6032

SILANE from Dow Corning®), vinyltrimethoxysilane (Z-6300 SILANE from Dow Corning®), and mercaptopropyltriethoxysilane (commercially available as Z-6910 SILANE from Dow Corning®).

The adhesion promoter may be present in the coating composition in an amount of at least 0.03% by weight, based on the total weight of the coating composition, such as at least 0.05% by weight, such as at least 0.08% by weight, and may be present in an amount of no more than 0.5% by weight, based on the total weight of the coating composition, such as no more than 0.20% by weight, such as no more than 0.14% by weight. According to the present invention, the adhesion promoter may be present in the coating composition in an amount of 0.03% to 0.5% by weight, based on the total weight of the coating composition, such as 0.05% to 0.20% by weight, such as 0.08% to 0.14% by weight.

According to the present invention, the coating composition may further comprise a solvent. According to the present invention, the solvent may comprise a high-evaporating solvent. As used herein, "high-evaporating solvent" comprises solvents having an evaporation rate relative to n-butyl acetate of 1.0 or greater. As will be appreciated by one skilled in the art, the relative evaporation rate of a solvent is the rate at which the solvent will vaporize (evaporate, change from liquid to vapor) compared to the rate of vaporization of a specific known solvent standard. Relative evaporation rates are reported herein relative to n-butyl acetate as the standard. The solvent standard is assigned a value of 1.0, and the evaporation rate of solvents are reported relative to that value. For example, a solvent having an evaporation rate of 3.0 relative to n-butyl acetate has an evaporation rate three times greater than n-butyl acetate. The evaporation rate is defined as the mass of material that evaporates from a surface per unit time. Use of a reference standard compensates for variations in test procedure or environmental factors. Suitable high-evaporating solvents may include, but are not limited to, esters such as methyl acetate, ethyl acetate, propyl acetate, isopropyl acetate and n-butyl acetate, ketones such as acetone and methyl ethyl ketone, aromatic hydrocarbons such as toluene, as well as combinations thereof.

The high-evaporating solvent may be present in an amount of at least 20% by weight, based on the total weight of the coating composition, such as at least 26% by weight, such as at least 30% by weight, and may be present in an amount of no more than 40% by weight, such as no more than 37% by weight, such as no more than 33% by weight. According to the present invention, the high-evaporating solvent may be present in an amount of 20% to 40% by weight, based on the total weight of the coating composition, such as 26% to 37% by weight, such as 30% to 33% by weight.

According to the present invention, the solvent may further comprise a slow-evaporating solvent. As used herein, "slow-evaporating solvent" comprises solvents having an evaporation rate relative to n-butyl acetate of 0.1 or less. Suitable slow-evaporating solvents may include, but are not limited to, ketones, esters, aromatic hydrocarbons and glycol ethers. Specific examples include diacetone alcohol (4-hydroxy-4-methylpentan-2-one) and dipropylene glycol monomethyl ether (commercially available as DOWANOL™ DPM from Dow Chemical Company).

The slow-evaporating solvent may be present in an amount of at least 3% by weight, based on the total weight of the coating composition, such as at least 4% by weight, such as at least 6% by weight, and may be present in an amount of no more than 15% by weight, such as no more than 11% by weight, such as no more than 9% by weight. According to the present invention, the slow-evaporating solvent may be present in an amount of 3% to 15% by weight, based on the total weight of the coating composition, such as 4% to 11% by weight, such as 6% to 9% by weight.

According to the present invention, the coating composition may optionally comprise a medium-evaporating solvent. As used herein, "medium-evaporating solvent" comprises solvents having an evaporation rate relative to n-butyl acetate of greater than 0.1 to less than 1.0. Suitable medium-evaporating solvents may include, but are not limited to, ketones, esters and aromatic hydrocarbons. Specific examples include xylene.

According to the present invention, the coating composition may be substantially free of water. As used herein, a coating composition is "substantially free" of water if water is present in the coating composition in an amount of less than 1% by weight, based on the total weight of the coating composition. The coating composition may also be essentially free of water. As used herein, a coating composition is essentially free of water if water is present only as an impurity and is not purposefully added such that water is present in an amount of less than 0.1% by weight, based on the total weight of the coating composition. The coating composition may also be completely free of water. As used herein, a coating composition is "completely free" of water if water is not present in the coating composition, i.e., 0% by weight.

According to the present invention, the coating composition may optionally comprise a pigment if color is desired. The pigment may comprise any suitable pigment known in the art. Suitable pigments include, but are not limited to, titanium dioxide, carbon black, red oxide, yellow oxide, extender pigments, or combinations thereof.

The pigment may be present in the coating composition in an amount of at least 18% by weight, based on the total weight of the coating composition, such as at least 21% by weight, such as at least 22% by weight, and may be present in an amount of no more than 35% by weight, such as no more than 24% by weight, such as no more than 23% by weight. According to the present invention, the pigment may be present in the coating composition in an amount of 18% to 35% by weight, based on the total weight of the coating composition, such as 21% to 24% by weight, such as 22% to 23% by weight.

According to the present invention, the coating composition may further comprise a dispersant. The dispersant may comprise any suitable dispersant known in the art. Examples of suitable dispersants include, but are not limited to, hydroxyl-functional carboxylic acid esters with pigment-affinic groups (commercially available as DISPERBYK 108 from Byk Additives and Instruments) and high molecular weight alkylolamino amide (commercially available as DISPERBYK 109 from Byk Additives and Instruments). Combinations of dispersants may also be used.

The dispersant may be present in the coating composition in an amount of at least 0.10% by weight, based on the total weight of the coating composition, such as at least 0.15% by weight, such as at least 0.20% by weight, and may be present in an amount of no more than 2.00% by weight, such as no more than 0.35% by weight, such as no more than 0.30% by weight. According to the present invention, the dispersant may be present in the coating composition in an amount of 0.10% to 2.00% by weight, based on the total weight of the coating composition, such as 0.15% to 0.35% by weight, such as 0.20% to 0.30% by weight.

According to the present invention, the coating composition may further comprise an anti-settling agent. The anti-settling agent may comprise any suitable anti-settling agent known in the art. Examples of suitable anti-settling agents include, but are not limited to, SUSPENO 201-X (commercially available from Poly-Resyn, Inc.) and organoclay gellants. Combinations of anti-settling agents may also be used.

The anti-settling agent may be present in the coating composition in an amount of at least 0.50% by weight, based on the total weight of the coating composition, such as at least 0.70% by weight, such as at least 0.90% by weight, and may be present in an amount of no more than 1.50% by weight, such as no more than 1.20% by weight, such as no more than 1.10% by weight. According to the present invention, the anti-settling agent may be present in the coating composition in an amount of 0.50% to 1.50% by weight, based on the total weight of the coating composition, such as 0.70% to 1.20% by weight, such as 0.90% to 1.10% by weight.

According to the present invention, the coating composition may further comprise an anti-skinning agent. The anti-skinning agent may comprise any suitable anti-skinning agent known in the art. Examples of suitable anti-skinning agents include ASCININ® Anti-Skin 0445 (commercially available from OMG Borchers, GmbH) and methyl ethyl ketoxime. Combinations of anti-skinning agents may also be used.

The anti-skinning agent may be present in the coating composition in an amount of at least 0.10% by weight, based on the total weight of the coating composition, such as at least 0.15% by weight, such as at least 0.20% by weight, and may be present in an amount of no more than 0.50% by weight, such as no more than 0.35% by weight, such as no more than 0.30% by weight. According to the present invention, the anti-skinning agent may be present in the coating composition in an amount of 0.10% to 0.50% by weight, based on the total weight of the coating composition, such as 0.15% to 0.35% by weight, such as 0.20% to 0.30% by weight.

According to the present invention, the coating composition may be in the form of an aerosol coating composition for use in an aerosol dispensing system. According to the present invention, the aerosol coating composition may comprise a concentrate comprising the components in the amounts provided in Table 1, below, the amounts given as % by weight, based on the total weight of the concentrate.

based on the total weight of the aerosol coating composition, such as 30% to 50% by weight, such as 35% to 45% by weight.

According to the present invention, the aerosol coating composition may further comprise a propellant. The propellant may comprise any suitable propellant known in the art. Examples of suitable propellants include hydrocarbons such as propane, n-butane, isobutane, n-pentane, and isopentane, ethers such as dimethyl ether and methyl dimethyl ether, fluorine-containing compounds such as 1,1-difluoroethane and 1,1,1,2-tetrafluoroethane, and combinations thereof.

The propellant may be present in the aerosol coating composition in an amount of at least 20% by weight, based on the total weight of the aerosol coating composition, such as at least 25% by weight, such as at least 30% by weight, and in an amount of no more than 45% by weight, such as no more than 40% by weight, such as no more than 35% by weight. According to the present invention, the propellant may be present in the aerosol coating composition in an amount of 20% to 45% by weight, based on the total weight of the aerosol coating composition, such as 25% to 40% by weight, such as 30% to 35%.

According to the present invention, the aerosol coating composition may further comprise additional high-evaporating solvent present in an amount of at least 17% by weight, based on the total weight of the aerosol coating composition, such as at least 20% by weight, such as at least 23% by weight, and may be present in an amount of no more than 35% by weight, such as no more than 32% by weight, such as no more than 29% by weight. The additional high-evaporating solvent may be present in the aerosol coating composition in an amount of 17% to 35% by weight, based on the total weight of the aerosol coating composition, such as 20% to 32% by weight, such as 24% to 29%. The additional high-evaporating solvent may be the same or different from the high-evaporating solvent(s) used in the concentrate.

According to the present invention, the coating composition may comprise, consist essentially of, or consist of the alkyd resin, the acrylic polymer, the metallic drier, the adhesion promoter, the solvent, the pigment, the dispersant, the anti-settling agent, and the anti-skinning agent, as described above.

According to the present invention, the coating composition may comprise, consist essentially of, or consist of the alkyd resin, the acrylic polymer, the metallic drier, the

TABLE 1

| Aerosol concentrate (wt. %) | Alkyd Resin | Acrylic Polymer | Met. Drier | Adh. Prom. | High-evap. solvent | Slow-evap. solvent | Anti-settling agent | Dispersant | Pigment | Anti-skin agent |
|---|---|---|---|---|---|---|---|---|---|---|
| First range | 14 to 28 | 4 to 20 | 0.20 to 0.90 | 0.03 to 0.30 | 18 to 52 | 0 to 15 | 0.3 to 1.5 | 0.1 to 1 | 0 to 40 | 0 to 1.0 |
| Second range | 17 to 25 | 8 to 14 | 0.3 to 0.8 | 0.05 to 0.20 | 23 to 45 | 2 to 10 | 0.5 to 1.1 | 0.15 to 0.30 | 0 to 40 | 0.1 to 0.5 |
| Third range | 20 to 24 | 10 to 12 | 0.4 to 0.6 | 0.08 to 0.12 | 32 to 36 | 3 to 7 | 0.8 to 1.0 | 0.2 to 0.4 | 24 to 27 | 0.2 to 0.4 |

The concentrate may be present in the aerosol coating composition in an amount of at least 20% by weight, based on the total weight of the aerosol coating composition, such as at least 30% by weight, such as at least 35% by weight, and may be present in an amount of no more than 60% by weight, such as no more than 50% by weight, such as no more than 45% by weight. According to the present invention, the aerosol concentrate may be present in the aerosol coating composition in an amount of 20% to 60% by weight, adhesion promoter, the solvent, the dispersant, the anti-settling agent, and the anti-skinning agent, as described above.

According to the present invention, the aerosol coating composition may comprise, consist essentially of, or consist of the alkyd resin, the acrylic polymer, the metallic drier, the adhesion promoter, the solvent, the pigment, the dispersant, the anti-settling agent, the anti-skinning agent and the propellant, as described above.

According to the present invention, the aerosol coating composition may comprise, consist essentially of, or consist of the alkyd resin, the acrylic polymer, the metallic drier, the adhesion promoter, the solvent, the pigment, the dispersant, the anti-settling agent, and the propellant, as described above.

According to the present invention, the coating composition may be prepared by high-shear mixing of the alkyd resin and pigment, as well as additives such as the dispersant and anti-settling agent, to produce a pigment paste. The other ingredients, such as the metallic drier, acrylic resin, solvents and additives such as the dispersant, anti-settling agent, adhesion promoter and/or anti-skinning agent are combined and mixed into the pigment paste mixture, and, after mixing, the mixture may be filtered to remove any particulate matter. Each of the recited components is prepared before being added to the coating composition, i.e., the components are not prepared in situ in the presence of the alkyd resin.

According to the present invention, the coating composition or aerosol coating composition may be a one-component coating composition. Alkyd resins are prepared using unsaturated acids and may chemically dry by an oxidative curing process (i.e., crosslink through the double bonds in the presence of the oxygen in the air). As such, alkyd resins do not need a separate crosslinking agent that would require separate storage and necessitate a two-component system.

According to the present invention, the coating composition may have a viscosity of 45 to 75 KU as measured by a Stormer-type viscometer according to ASTM D562 at 77° F., such as 50 to 65 KU, such as 55 to 60 KU.

According to the present invention, the coating composition may be substantially free of epoxy-containing compounds. As used herein, a coating composition is "substantially free" of epoxy-containing compounds if epoxy-containing compounds are present in the coating composition in an amount of 5% by weight or less, based on the total weight of the coating composition.

According to the present invention, the coating composition may be essentially free of epoxy-containing compounds. As used herein, a coating composition is "essentially free" of epoxy-containing compounds if epoxy-containing compounds are not intentionally added and are present in the coating composition in an amount of 1% by weight or less, based on the total weight of the coating composition.

According to the present invention, the coating composition may be completely free of epoxy-containing compounds. As used herein, a coating composition is "completely free" of epoxy-containing compounds if epoxy-containing compounds are not present in the coating composition, i.e., 0% by weight, based on the total weight of the coating composition.

The present invention is also directed to a method of coating a substrate comprising applying the coating composition described above to the substrate and allowing the coating composition to cure under ambient conditions. As used herein, "ambient conditions" is defined as about 70-80° F. and 30-65% relative humidity.

According to the present invention, the substrate may comprise fiberglass, porcelain, glazed ceramic, or countertop laminate materials. The substrate may be, but is not limited to, a bathtub, sink or tile. The coating composition may be used to refinish such substrates. Accordingly, the coating composition may be a refinish coating composition.

According to the present invention, the coating may be applied by conventional methods such as brushing with a brush, rolling with a roller, wiping or spraying. Spraying may be accomplished by airless or entrained air sprayer or aerosol spraying by using an aerosol dispensing system.

According to the present invention, the coating compositions may be applied at desired wet film thicknesses without sagging as measured according to ASTM D4400. For example, the coating composition exhibits sag resistance when applied at a thickness of 6 wet mils. This sag resistance level allows the coating composition to flow out to create a smooth film when applied. The coating composition may have a sag resistance of less than 7 wet mils. Accordingly, the applied coating composition may have a wet-film thickness of up to 6 mils, such as up to 5 mils, such as up to 4 mils, such as up to 2 mils. At such wet film thicknesses, the coating composition is sag resistant. The coating composition may have a wet-film thickness of 2 to 6 mils, such as 4 to 6 mils, such as 5 to 6 mils.

According to the present invention, the coating composition may cure to form a coating in less than 72 hours, such as 60 hours or less, such as 48 hours or less, such as less than 48 hours. As used herein, the coating composition is considered to be "cured" when the coating formed has a pencil hardness (as defined herein) of B or harder.

The present invention is also directed to a coating formed by at least partially curing the coating composition described above.

According to the present invention, the coating may have a 20° gloss value as measured according to ASTM D523 of at least 65 gloss units, such as at least 70 gloss units, such as at least 75 gloss units.

According to the present invention, the coating may have a 60° gloss value as measured according to ASTM D523 of at least 90 gloss units, such as at least 92 gloss units, such as at least 93 gloss units.

According to the present invention, the coating may have a measured whiteness index value of at least 60, as measured according to ASTM E-313, such as at least 65, such as at least 70.

According to the present invention, the coating may have a measured yellowness index value of no more than 8, as measured according to ASTM E-313, such as no more than 6, such as no more than 5.

According to the present invention, the coating may have a pencil hardness of at least 2B after 24 hours of curing under ambient conditions, as measured according to ASTM D3363, such as at least B. As will be appreciated by one skilled in the art, pencil hardness is reported on a scale from softer to harder of 4B<3B<2B<B<HB<F<H<2H.

According to the present invention, the coating may have a pencil hardness of at least B after 48 hours of curing under ambient conditions, as measured according to ASTM D3363, such as at least HB.

According to the present invention, the coating may have a pencil hardness of at least HB after 72 hours of curing under ambient conditions, as measured according to ASTM D3363, such as at least F.

According to the present invention, the coating may have an adhesion of at least 750 psi (5,171.1 kPa) after 48 hours of curing under ambient conditions, as measured according to the Adhesion Test Procedure, such as at least 800 psi (5,515.8 kPa), such as at least 825 psi (5,688.2 kPa). According to the Adhesion Test Procedure (more fully described in the examples below), adhesion is measured by gluing an aluminum dolly to a coated substrate using superglue and allowing the superglue to cure for one hour. The aluminum dolly and coating is then removed from the substrate using a manual hydraulic pump that measures the force required to remove the coating from the substrate in pounds per square inch (psi).

According to the present invention, the coating may have an adhesion of at least 800 psi (5,515.8 kPa) after 72 hours of curing under ambient conditions as measured by the Adhesion Test Procedure, such as at least 825 psi (5,688.2 kPa), such as at least 840 psi (5,719.6 kPa).

According to the present invention, the coating may have a water-soak adhesion of at least 700 psi (4,826.3 kPa) after 72 hours of curing under ambient conditions and 1 hour water-soak immersion in water having a temperature of 105° F. as measured by the Water-Soak Adhesion Procedure, such as at least 725 psi (4,998.7 kPa), such as at least 740 psi (5,102.1 kPa). According to the Water-Soak Adhesion Procedure, adhesion is measured in the same manner as the Adhesion Test Procedure except that after the superglue is allowed to cure for 1 hour, the substrate and glued aluminum dolly are immersed in a 105° F. water bath for one hour, removed and dried prior to measured adhesion using the manual hydraulic pump.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "an" alkyd resin, "an" acrylic polymer, "a" metallic drier, "a" solvent, a combination (i.e., a plurality) of these components can be used. In addition, in this application, the use of "or" means "and/or" unless specifically stated otherwise, even though "and/or" may be explicitly used in certain instances.

ASPECTS

1. A coating composition comprising:
an alkyd resin;
an acrylic polymer;
a metallic drier;
an adhesion promoter; and
an organic solvent.

2. The coating composition of Aspect 1, wherein the metallic drier is selected from salts or complexes of redox-active transition metals and mixtures thereof.

3. The coating composition of Aspect 2, wherein the redox-active transition metals are selected from iron, cobalt, manganese, and vanadium.

4. The coating composition of Aspect 2 or 3, wherein the metallic drier is selected from carboxylates, such as $C_6$-$C_{18}$ carboxylates, halides, nitrates, sulfates, and complexes comprising multidentate ligands such as acetoacetonate and tridentate, tetradentate, pentadentate or hexadentate nitrogen donor ligands including bispidine ligands such as bispidon (dimethyl 3-methyl-9-oxo-2,4-di(pyridine-2-yl)-7-(pyridine-2-ylmethyl)-3,7-diazabicyclo[3.3.1]nonane-1,5-dicarboxylate).

5. The coating composition of Aspect 4, wherein the metallic drier is [(bispidon)Fe(II)Cl]Cl or [(bispidon)Fe(II)]SO$_4$.

6. The coating composition of any of Aspects 1 to 5 which is free of a dinuclear manganese complex comprising a 1,4,7-trisubstituted-1,4,7-triazacyclononane ligand.

7. The coating composition of any of Aspects 1 to 6, wherein the alkyd resin is chain-stopped.

8. The coating composition of any of Aspects 1 to 7, wherein the alkyd resin has a hydroxyl equivalent weight of 200 g/OH to 800 g/OH, such as 300 g/OH to 700 g/OH, such as 400 g/OH to 600 g/OH, such as 450 g/OH to 550 g/OH.

9. The coating composition of any of Aspects 1 to 8, wherein the acrylic polymer comprises residues derived from a cycloaliphatic monomer in an amount of less that 45% by weight, based on the total weight of monomers polymerized, or is free from residues derived from a cycloaliphatic monomer.

10. The coating composition of any of Aspects 1 to 9, wherein the acrylic polymer comprises a copolymer comprising the residues of methyl methacrylate and butyl methacrylate.

11. The coating composition of any of Aspects 1 to 10, wherein the acrylic polymer has a weight average ($M_w$) molecular weight of 15,000 g/mol to 40,000 g/mol, such as 20,000 g/mol to 35,000 g/mol, such as 28,000 g/mol to 32,000 g/mol.

12. The coating composition of any of Aspects 1 to 11, wherein the acrylic polymer is free of hydroxyl functional groups.

13. The coating composition of any of Aspects 1 to 12, wherein the weight ratio of alkyd resin to acrylic polymer is 1:1 to 10:1, such as 1.5:1 to 5:1, such as 2:1 to 4:1.

12. The coating composition of any of Aspects 1 to 11, wherein the adhesion promoter comprises a silane such as an organosilane e.g. an organo trialkoxysilane.

13. The coating composition of Aspect 12, wherein the silane comprises an organosilane having the general formula X—R—Si(OR')$_3$, wherein X is a hydrogen atom or a non-hydrolyzable organic moiety such as amino, vinyl, (meth)acrylate, epoxy, mercapto, chloropropyl, or sulfide, R is an aryl or alkyl chain, e.g. C$_1$ to C$_{10}$ aryl or alkyl, or combined aryl-alkyl chain, and OR' is a hydrolyzable group, such as an alkoxy group, e.g. C$_1$ to C$_4$ alkoxy, or an acetoxy group.

14. The coating composition of any of Aspects 1 to 13, further comprising a secondary metallic drier selected from salts or complexes of zinc, strontium, zirconium, calcium, and mixtures thereof.

15. The coating composition of any of Aspects 1 to 14 comprising:
  20% to 45% by weight, such as 23% to 31% by weight, such as 25% to 29% by weight of the alkyd resin, based on the total weight of the coating composition.

16. The coating composition of any of Aspects 1 to 15 comprising:
  2% to 10% by weight, such as 3% to 8% by weight, such as 4% to 6% by weight of the acrylic polymer, based on the total weight of the coating composition.

17. The coating composition of any of Aspects 1 to 16 comprising:
  0.20% to 0.65% by weight, such as 0.35% to 0.55% by weight, such as 0.40% to 0.50% by weight of metallic drier, based on the total weight of the coating composition.

18. The coating composition of any of Aspects 1 to 17 comprising:
  0.03% to 0.5% by weight, such as 0.05% to 0.20% by weight, such as 0.08% to 0.14% by weight of the adhesion promoter, based on the total weight of the coating composition.

19. The coating composition of any of Aspects 1 to 18 comprising:
  23% to 55% by weight, such as 30% to 48% by weight, such as 36% to 42% by weight. of the organic solvent, based on the total weight of the coating composition.

20. The coating composition of any of Aspects 1 to 19 comprising:
  20% to 45% by weight of the alkyd resin, based on the total weight of the coating composition;
  2% to 10% by weight of the acrylic polymer, based on the total weight of the coating composition;
  0.20% to 0.65% by weight of the metallic drier, based on the total weight of the coating composition;
  0.03% to 0.5% by weight of the adhesion promoter, based on the total weight of the coating composition; and
  23% to 55% by weight of the organic solvent, based on the total weight of the coating composition.

21. The coating composition of any of Aspects 1 to 20, which is obtained by a process comprising combining the acrylic polymer with the alkyd resin.

22. The coating composition of any of Aspects 1 to 21, wherein the organic solvent comprises a high-evaporating solvent present in an amount of 20% to 40% by weight, such as 26% to 37% by weight, such as 30% to 33% by weight, based on the total weight of the coating composition.

23. The coating composition of Aspect 22, wherein the solvent further comprises a slow-evaporating solvent present in an amount of 3% to 15% by weight, such as 4% to 11% by weight, such as 6% to 9% by weight, based on the total weight of the coating composition.

24. The coating composition of any of Aspects 1 to 23, further comprising 18% to 35% by weight, such as 21% to 24% by weight, such as 22% to 23% by weight of a pigment, based on the total weight of the coating composition.

25. The coating composition of any of Aspects 1 to 24, further comprising 0.10% to 1.00% by weight of a dispersant, based on the total weight of the coating composition.

26. The coating composition of any of Aspects 1 to 25, further comprising 0.50% to 1.10% by weight of an anti-settling agent, based on the total weight of the coating composition.

27. The coating composition of any of Aspects 1 to 26, further comprising 0.10% to 0.50% by weight of an anti-skinning agent, based on the total weight of the coating composition.

28. The coating composition of any of Aspects 1 to 27, further comprising a propellant, wherein the coating composition is an aerosol coating composition.

29. The coating composition of any of Aspects 1 to 28, wherein the coating composition has a viscosity of 50 to 60 KU as measured by a Stormer-type viscometer according to ASTM D 562 at 77° F. (25° C.).

30. The coating composition of any of Aspects 1 to 29, wherein the coating composition has a sag resistance of less than 7 wet mils, as measured by an anti-sag meter according to ASTM D4400.

31. The coating composition of any of Aspects 1 to 30, wherein the coating composition exhibits a 20° gloss value of at least 70 gloss units as measured according to ASTM D523 after cure.

32. The coating composition of any of Aspects 1 to 31, wherein the coating composition exhibits a whiteness value of at least 65 as measured according to ASTM E-313 after cure.

33. The coating composition of any of Aspects 1 to 32, wherein the coating composition exhibits a yellowness value of no more than 6 as measured according to ASTM E-313 after cure.

34. The coating composition of any of Aspects 1 to 33, wherein the coating composition exhibits a pencil hardness of at least HB as measured according to ASTM D3363 after 72 hours curing of a 1 mm thick (wet-film thickness) film under ambient conditions at 25° C. and 50% relative humidity.

35. The coating composition of any of Aspects 1 to 34, wherein the coated composition exhibits an adhesion of at least 800 psi (5,515.8 kPa) after 48 hours of curing of a 1 mm thick (wet-film thickness) film under ambient conditions at 25° C. and 50% relative humidity as measured according to the Adhesion Test Procedure.

36. A coating formed by at least partially curing the coating composition of any of Aspects 1 to 35.

37. A method of coating a substrate comprising:
  applying the coating composition of any of Aspects 1 to 35 to the substrate; and
  allowing the coating composition to cure to form a coating at ambient conditions.

38. The method of Aspect 37, wherein the coating composition cures to form a coating at ambient conditions at 25° C. and 50% relative humidity in less than 72 hours.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

An exemplary coating composition corresponding to the composition in Table 2 below was prepared as follows:

TABLE 2

| | Ingredient | Wt. % |
|---|---|---|
| Alkyd resin | LA-8814 resin (chain-stopped alkyd resin available from US Polymers) (provided as 70% solution in butyl acetate; wt. % reported as resin solids) | 27.30% |
| Anti-settling agent | SUSPENO 201-X (available from Poly-Resyn, Inc.) | 0.81% |
| Dispersant | DISPERBYK 108 (available from Byk Additives and Instruments) | 0.25% |
| Pigment | CR 828 TiO2 (available from Tronox Ltd.) | 22.36% |
| High-evaporating solvent | Butyl Acetate | 2.60% |
| Acrylic polymer | PARALOID XR-34 (copolymer of methyl methacrylate and butyl methacrylate available from The Dow Chemical Company) (50% solution by weight solids in xylene; wt. % reported as total weight of solution) | 9.55% |
| Slow-evaporating solvent | Diacetone alcohol | 4.33% |
| High-evaporating solvent | Butyl Acetate | 20.19% |
| Anti-skinning agent | ASCININ anti-skin 0445 (available from OMG Borchers GmbH) | 0.26% |
| Adhesion promoter | Z 6020 SILANE (aminoethyl-aminopropyltrimethoxysilane available from Dow Corning Company) | 0.09% |
| High-evaporating solvent | Butyl Acetate | 8.81% |
| Slow-evaporating solvent | DOWANOL DPM (dipropylene glycol monomethyl ether available from The Dow Chemical Company) | 3.01% |
| Metallic drier | Borchi ® Oxy-Coat (available from OMG Borchers GmbH) | 0.47% |
| | TOTAL | 100.00% |

The LA-8814 resin was charged into an open-air dispersion mill equipped with a high-shear mixing Cowles blade. Agitation was started and the SUSPENO 201-X and DISPERBYK 108 were added. The titanium dioxide was then sifted into the mix followed by the first butyl acetate addition and the agitator speed was increased to high-speed. An exotherm was observed resulting from the grinding of the titanium dioxide particles. The temperature was allowed to rise to 110-120° F. and the agitation was continued for approximately 40 to 60 minutes to grind the titanium dioxide to 8+ N.S. on the Hegman scale. The resulting pigment paste was pumped from the dispersion mill into a let-down tank. The remaining ingredients were added sequentially under low agitation, and agitation was continued for 30 minutes following the addition of all ingredients. The mixture was then filtered through a 10 micron filter to remove any particulate matter. The resultant coating composition has a viscosity of about 58 KU as measured by a Stormer-type viscometer according to ASTM D562 at 77° F.

Example 2

A comparative coating composition according to the formula in Table 3 below was prepared as follows:

TABLE 3

| | Ingredient | Wt. % |
|---|---|---|
| Epoxy resin | Epitex 183-E (oil modified epoxy resin available from US Polymers-Accurez) | 54.73% |
| Anti-settling agent | SUSPENO 201-X (available from Poly-Resyn, Inc.) | 0.86% |
| Dispersant | DISPERBYK 108 (available from Byk Additives and Instruments) | 0.28% |
| Pigment | CR 828 TiO2 (available from Tronox Ltd.) | 27.36% |
| Metallic drier | Borchi ® Oxy-Coat (available from OMG Borchers GmbH) | 0.20% |
| Slow-evaporating solvent | DOWANOL DPM (available from The Dow Chemical Company) | 12.94% |
| Slow-evaporating solvent | Hi Sol 15 (available from Power Kleen Corp.) | 1.13% |
| Anti-skinning agent | Exkin #2 (available from OMG Borchers GmbH) | 0.40% |
| Adhesion promoter | Z-6020 SILANE (available from Dow Corning Company) | 0.10% |
| Slow-evaporating solvent | DOWANOL DPM (available from The Dow Chemical Company) | 2.00% |
| | TOTAL | 100.00% |

30% of the Epitex 183-E was charged into an open-air dispersion mill equipped with a high-shear mixing Cowles blade. Agitation was started and the SUSPENO 201-X and DISPERBYK 108 were added. The titanium dioxide was then sifted into the mix and the agitator speed was increased to high-speed. The Borchi® Oxy-Coat, DOWANOL DPM and Hi Sol 15 were added sequentially and an exotherm was observed resulting from the grinding of the titanium dioxide particles. The temperature was allowed to rise to 110-120° F. and the agitation was continued for approximately 15 to 20 minutes to grind the titanium dioxide to 8+ N.S. on the Hegman scale. The resulting pigment paste was pumped from the dispersion mill into a letdown tank with the remaining 70% of the Epitex 183-E and some DOWANOL DPM used to rinse the mill and wash the paste into the letdown tank. The Exkin #2 and Z 6020 SILANE were then added sequentially under low agitation. Agitation was continued for 30 minutes following addition of the Z 6020 SILANE. The mixture was then filtered through a 10 micron filter to remove any particulate matter.

The coating compositions of Example 1 and Example 2 were applied to porcelain tile substrates by brush at a wet-film thickness of about 3-4 mils. The resulting coatings were tested for gloss, whiteness, yellowness, pencil hardness, adhesion and water-soak adhesion according to the following procedures.

Gloss was measured by a HORIBA Gloss Checker, model IG-331 gloss meter according to ASTM D523. The results are reported in Table 4 below.

The whiteness index value and yellowness index value was measured using a MINOLTA Colorimeter according to ASTM E-313. The results are reported in Table 4 below.

Pencil hardness was measured using MITSUBISHI UNi/JPIA Pencils 6B-9H (available from Paul N. Gardner Co., Inc., item number HA-3460) according to ASTM D3363.

Adhesion to the porcelain tile substrate was tested according to the Adhesion Test Procedure described above using Loctite® Super Glue Gel Control™ superglue and a DeFelsko PosiTest® AT-M manual hydraulic pump with a 20 mm diameter aluminum dolly. The adhesion was measured after allowing the coating composition to cure at ambient conditions for 48 hours and 72 hours, respectively. The Adhesion Test Procedure was repeated three times for each variable, and the adhesion value reported in Table 4 is the average of the three results.

Water-soak adhesion to a porcelain substrate was tested according to the Water-Soak Adhesion Test Procedure described above using Loctite® Super Glue Gel Control™ superglue and a DeFelsko PosiTest® AT-M manual hydraulic pump with a 20 mm diameter aluminum dolly. The adhesion was measured after allowing the coating composition to cure at ambient conditions for 72 hours followed by one hour immersion in a 105° F. water bath. The Water-Soak Adhesion Test Procedure was repeated three times for each variable, and the adhesion value reported in Table 4 is the average of the three results.

TABLE 4

| Test | Example 1 | Example 2 |
|---|---|---|
| 20°/60° gloss | 78/93 | 57/91 |
| ASTM E-313 Whiteness | 72.3 | 56.7 |
| ASTM E-313 Yellowness | 4.7 | 8.2 |
| Pencil hardness @ 24 hr* | 2B | 4B |
| Pencil hardness @ 48 hr | B | 2B |
| Pencil hardness @ 72 hr | HB | 2B |
| Adhesion, 2 days air dry | 825 | N/A |
| Adhesion, 3 days air dry | 844 | 779 |
| Adhesion 3 days air dry, after 1 hr immersion in H2O @ 105° F. | 740 | 690 |

*Pencil hardness, from softer to harder: 4B < 3B < 2B < B < HB < F < H < 2H

The 20° gloss results show a significant increase in gloss of the coating resulting from the coating composition of Example 1 over the coating resulting from the comparative coating composition of Example 2, while the 60° gloss results show a slight increase over the comparative.

The whiteness and yellowness testing show significant improvement in both the whiteness appearance and yellowness appearance of the coating resulting from the coating composition of Example 1 over the coating resulting from the comparative coating composition of Example 2.

The pencil hardness testing show an improvement in the hardness of the coating of Example 1 at 24 hours cure, 48 hours cure and 72 hours cure over the comparative coating of Example 2. In fact, the coating composition of Example 1 had a harder coating at 48 hours cure than the comparative coating composition of Example 2 at 72 hours cure indicating significantly faster cure.

The adhesion results show significant improvement at 48 hours cure over the comparative coating composition. The coating of Example 1 had a significantly improved adhesion at 48 hours cure over the comparative coating of Example 2 which did not have sufficient cure at 48 hours to be tested. The coating of Example 1 had a 48 hour cure adhesion that was also about 6% greater than the comparative coating of Example 2 at 72 hours cure, indicating a significantly faster cure and a shorter dry-to-use time. The dry-to-use time is the time after application at which a sufficient amount of curing has occurred to allow for the cured coating to be used for its intended purpose, e.g., as the surface of a bathtub or sink. These results indicate that the dry-to-use time of the coating composition of Example 1 is at most 48 hours, i.e., the time at which the coating is considered to be cured. Additionally, the coating composition adhesion at 72 hours cure of Example 1 was over 8% greater than the comparative coating of Example 2 at 72 hours cure.

The water-soak adhesion results also show significant improvement at 72 hours curing for the coating of Example 1 over the comparative coating of Example 2.

These results demonstrate that the experimental coating composition of Example 1 results in a coating having significantly improved aesthetic and physical properties over the comparative coating composition of Example 2.

Example 3

An exemplary aerosol coating composition may be prepared by the following procedure. An aerosol concentrate may be prepared according to the following formula provided in Table 5 below:

TABLE 5

| Ingredient | | Wt. % |
|---|---|---|
| Alkyd resin | LA-8814 resin (US polymers) (provided as 70% solution in butyl acetate; wt. % reported as resin solids) | 31.54% |
| Anti-settling agent | SUSPENO 201-X (available from Poly-Resyn, Inc.) | 0.93% |
| Dispersant | DISPERBYK 108 (available from Byk Additives and Instruments) | 0.29% |
| Pigment | CR 828 TiO2 (available from Tronox Ltd. | 25.84% |
| High-evaporating solvent | Butyl Acetate | 3.00% |
| Acrylic polymer | PARALOID XR-34 (available from The Dow Chemical Company) (50% solution by weight solids in xylene; wt. % reported as total weight of solution) | 11.04% |
| Slow-evaporating solvent | Diacetone alcohol | 5.00% |
| High-evaporating solvent | Butyl Acetate | 21.42% |
| Anti-skinning agent | ASCININ anti-skin 045 (available from OMG Borchers GmbH) | 0.30% |
| Adhesion promoter | Z 6020 SILANE (available from Dow Corning Company) | 0.10% |
| Metallic drier | Borchi ® Oxy Coat (available from OMG Borchers GmbH) | 0.54% |
| TOTALS | | 100.00% |

The LA-8814 resin was charged into an open-air dispersion mill equipped with a high-shear mixing Cowles blade. Agitation was started and the SUSPENO 201-X and DISPERBYK 108 were added. The titanium dioxide was then sifted into the mix followed by the first butyl acetate addition and the agitator speed was increased to high-speed. An exotherm was observed resulting from the grinding of the titanium dioxide particles. The temperature was allowed to rise to 110-120° F. and the agitation was continued for approximately 40 to 60 minutes to grind the titanium dioxide to 8+ N.S. on the Hegman scale. The resulting pigment paste was pumped from the dispersion mill into a letdown tank. The remaining ingredients were added sequentially under low agitation, and agitation was continued for 30 minutes following the addition of all ingredients. The mixture was then filtered through a 10 micron filter to remove any particulate matter. The viscosity of the resulting concentrate may be described as water-thin.

The concentrate may be combined with a propellant and additional high-evaporating solvent to form an aerosol coating composition according to the formula provided in Table 6 below.

TABLE 6

| Ingredient | Grams | Wt. % |
|---|---|---|
| CONCENTRATE (ABOVE) | 189.5 | 41.19% |
| Methyl Acetate (high-evaporating solvent) | 121.8 | 26.47% |
| Dimethyl Ether (propellant) | 148.8 | 32.34% |
|  | 460.1 | 100.00% |

The resulting aerosol coating composition atomizes very well, has good sag resistance, excellent dry time and very high gloss. It is also compliant with the California Air Resources Board's (CARB) Aerosol Paint Regulation, which expresses the VOC content of an aerosol as Maximum Incremental Reactivity (MIR), which measures grams of ozone produced per gram of product. The allowable limit for this type of aerosol coating composition is 0.95; the calculated MIR is 0.49. Thus, it should remain compliant for years, even as CARB decreases the allowable MIR in such aerosol coating compositions.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

The invention claimed is:

1. A coating composition comprising:
   a chain-stopped alkyd resin;
   an acrylic polymer;
   a metallic drier;
   an adhesion promoter; and
   a solvent.

2. The coating composition of claim 1, wherein the chain-stopped alkyd resin has a hydroxyl equivalent weight of 200 g/OH to 800 g/OH.

3. The coating composition of claim 1, wherein the acrylic polymer comprises a copolymer comprising the residue of methyl methacrylate and butyl methacrylate.

4. The coating composition of claim 1, wherein the acrylic polymer has a weight average ($M_w$) molecular weight of 15,000 g/mol to 40,000 g/mol.

5. The coating composition of claim 1, wherein the acrylic polymer is substantially free of acrylic polymer comprising hydroxyl functional groups, and acrylic polymer comprising hydroxyl functional groups are present in the coating composition in an amount of 1% by weight or less, based on the total weight of the acrylic polymer.

6. The coating composition of claim 1, wherein the weight ratio of chain-stopped alkyd resin to acrylic polymer is 1:1 to 10:1.

7. The coating composition of claim 1, wherein the metallic drier comprises a metal ligand complex comprising [(bispidon)Fe(II)Cl]Cl, chloro[dimethyl-9,9-dihydroxy-3-methyl-2,4-di(2-pyridyl[(2-pyridinyl-κN)methyl]-3,7-diazabicyclo[3.3.1]nonane-1,5-dicarboxylate-κN3, κN7].

8. The coating composition of claim 1, wherein the adhesion promoter comprises a silane.

9. The coating composition of claim 1 comprising:
   20% to 45% by weight of the alkyd resin, based on the total weight of the coating composition;
   2% to 10% by weight of the acrylic polymer, based on the total weight of the coating composition;
   0.20% to 0.65% by weight of the metallic drier, based on the total weight of the coating composition;
   0.03% to 0.5% by weight of the adhesion promoter, based on the total weight of the coating composition; and
   23% to 55% by weight of the solvent, based on the total weight of the coating composition.

10. The coating composition of claim 9, wherein the solvent comprises a high-evaporating solvent present in an amount of 20% to 40% by weight, based on the total weight of the coating composition.

11. The coating composition of claim 10, wherein the solvent further comprises a slow-evaporating solvent present in an amount of 3% to 15% by weight, based on the total weight of the coating composition.

12. The coating composition of claim 9, further comprising 18% to 35% by weight of a pigment, based on the total weight of the coating composition.

13. The coating composition of claim 9, further comprising 0.10% to 1.00% by weight of a dispersant, based on the total weight of the coating composition.

14. The coating composition of claim 9, further comprising 0.50% to 1.10% by weight of an anti-settling agent, based on the total weight of the coating composition.

15. The coating composition of claim 9, further comprising 0.10% to 0.50% by weight of an anti-skinning agent, based on the total weight of the coating composition.

16. The coating composition of claim 1, further comprising a propellant, wherein the coating composition is an aerosol coating composition.

17. The coating composition of claim 1, wherein the coating composition has a viscosity of 50 to 60 KU as measured by a Stormer-type viscometer according to ASTM D 562 at 77° F.

18. The coating composition of claim 1, wherein the coating composition has a sag resistance of less than 7 wet mils, as measured by an anti-sag meter according to ASTM D4400.

19. The coating composition of claim 1, wherein the coating composition exhibits a 20° gloss value of at least 70 gloss units as measured according to ASTM D523 after cure.

20. The coating composition of claim 1, wherein the coating composition exhibits a whiteness value of at least 65 as measured according to ASTM E-313 after cure.

21. The coating composition of claim 1, wherein the coating composition exhibits a yellowness value of no more than 6 as measured according to ASTM E-313 after cure.

22. The coating composition of claim 1, wherein the coating composition exhibits a pencil hardness of at least HB as measured according to ASTM D3363 after 72 hours curing under ambient conditions.

23. The coating composition of claim 1, wherein the coated composition exhibits an adhesion of at least 800 psi (5,515.8 kPa) after 48 hours of curing under ambient conditions as measured according to the Adhesion Test Procedure.

24. A coating formed by curing the coating composition of claim 1.

25. A method of coating a substrate comprising:
   applying the coating composition of claim 1 to the substrate; and
   allowing the coating composition to cure to form a coating at ambient conditions.

26. The method of claim 25, wherein the coating composition cures to form a coating at ambient conditions in less than 72 hours.

* * * * *

UNITED STATES PATENT AND TRADEMARK OFFICE
CERTIFICATE OF CORRECTION

PATENT NO. : 9,914,848 B1
APPLICATION NO. : 15/338670
DATED : March 13, 2018
INVENTOR(S) : John R. Kordosh Page 1 of 1

It is certified that error appears in the above-identified patent and that said Letters Patent is hereby corrected as shown below:

In the Claims

Column 19, Line 59, Claim 7:
di(2-pyridyl[(2-pyridinyl-κN)methyl]
Should be:
di(2-pyridyl-κN)-7-[(2-pyridinyl-κN)methyl]

Signed and Sealed this
First Day of January, 2019

Andrei Iancu
*Director of the United States Patent and Trademark Office*